June 14, 1932.                H. D. GEYER                1,863,370
                          RESILIENT CONNECTION
                          Filed Dec. 6, 1929

Inventor
Harvey D. Geyer
By Spencer Hardman & Fehr
His Attorneys

Patented June 14, 1932

1,863,370

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

RESILIENT CONNECTION

Application filed December 6, 1929. Serial No. 412,131.

This invention relates to means for connecting two metal members through a metal-isolating, slightly yieldable material such as soft rubber.

One object of this invention is to provide a mounting bracket having a plurality of separate bolt holes for securing it to another member, each of the holes having a separate resilient bushing therein permanently retained and compressed therein so as to isolate the through bolt or rivet from said bracket.

Another object is to provide a very simple, efficient, and economical means for retaining and compressing such an isolating resilient bushing in place within a bolt hole in a relatively thin metal member so that said metal member may be simply bolted or riveted directly upon a second metal member but will be held isolated therefrom by said resilient bushing.

Further objects and advantages of the present invention will be apparent from the following description, reference being had to the accompanying drawing wherein a preferred embodiment of one form of the present invention is clearly shown.

In the drawing.

Similar reference characters refer to similar parts throughout the several views.

Figure 1:
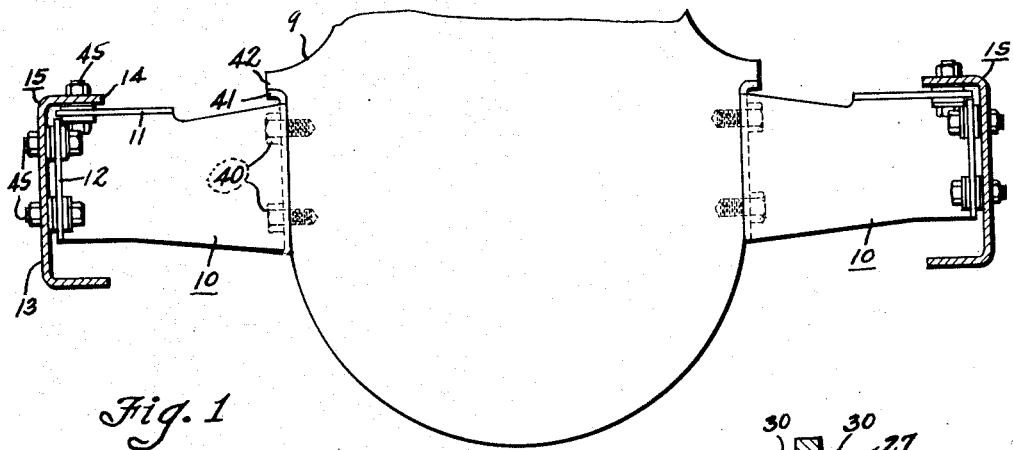
Fig. 1 illustrates two metal-isolating brackets made according to this invention used to support the rear end of an automobile engine upon the two side channels of the chassis frame.
Figure 2:
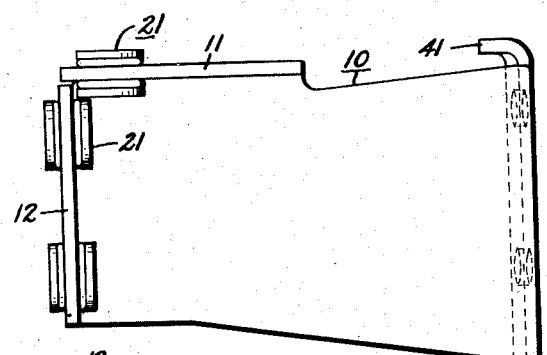
Fig. 2 is a larger side elevation view of the bracket unit having the resilient bushings permanently retained and compressed within the bolt holes.
Figure 3:
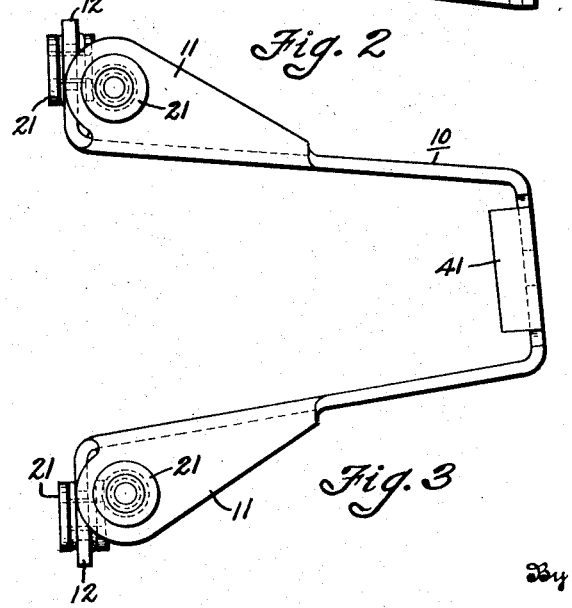
Fig. 3 is a top view of the bracket unit of Fig. 2.

Numeral 10 marks the large pressed metal bracket which has the general form of the letter U, but with the additional flanges 11 and 12 thereon which project in planes at right angles to each other so as to lie parallel with the vertical web 13 and the horizontal flange 14 respectively of the side rail 15 of the chassis frame. Two spaced bolt holes are provided in each of the vertical flanges 12 and one bolt hole in each of the horizontal flanges 11 of the bracket 10. Each of these bolt holes designated by 19 in Fig. 4, is provided with a separate resilient bushing 20, preferably of soft rubber, which is highly compressed and permanently fixed therein by a metal spool indicated as a whole by 21, which spool 21 is resiliently but firmly supported and isolated from the bracket 10.

Figure 4:
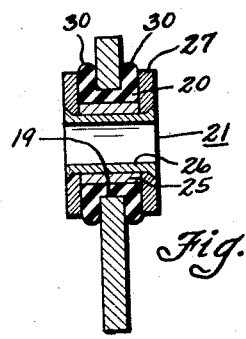
Fig. 4 is a center line section through one of the isolated bolt holes of the bracket unit and shows the resilient bushing permanently compressed and fixed within the bolt hole.
Figures 5, 6:
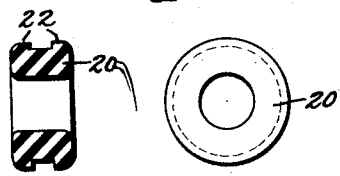
Figs. 5 and 6 are sectional and end views respectively of the resilient rubber bushing as molded and prior to its distortion as shown in Fig. 4.
Figures 7, 8:
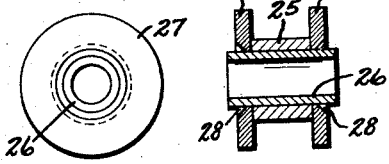
Figs. 7 and 8 are end and sectional views respectively showing how the parts of the metal spool are assembled together.

A feature of this invention is the very simple yet efficient structure shown in Fig. 4. The resilient rubber bushings 20 are first molded preferably with the small end flanges 22 thereon, as shown in Figs. 5 and 6, and of such size that when said bushings are pressed into the holes 19 they will fit snugly therein. The separate parts of the metal spool 21 are then applied to the bushing 20 preferably as follows: First the short spacer sleeve 25 is forced into the somewhat smaller central aperture in bushing 20; next the central tube 26 is inserted through the spacer sleeve 25 and the two annular end disks 27 are inserted over the opposite projecting ends of tube 26 and pressed in place until they abut the spacer sleeve 25, thereby highly compressing the bushing 20 and causing it to bulge radially outward at the unconfined annular edges 30, as shown in Fig. 4. The projecting ends of the central tube 26, which then project as shown in Fig. 8, are then upset in a suitable die press to fill the countersunk holes 28 in disks 27 to form the permanently assembled structure shown in Fig. 4. It will be noted that the relatively small molded flanges 22 of the rubber bushing 20 are greatly enlarged by the flow of rubber when bushing 20 is put under high compression. The rubber fibers at the bulges 30 are therefore put under high tension due to such outward bulging since the rubber has an inherent tendency to return to its original or molded form shown in Fig. 5. This tension on the rubber fibers at bulges 30 will highly resist any additional radial outward flow of rubber at these unconfined annular edges and hence there will be very little if any further distortion of the rubber when the weight load of the engine, or any other additional load falls upon the bracket 10. Therefore the metal spool 21 will be very firmly and adequately supported upon the bracket 10 but at the same time it will be isolated therefrom by the resilient bushing 20 which will dampen or entirely prevent the transmission of sound and all high frequency vibrations from the bracket 10 to the chassis rail 13 when the parts are assembled as shown in Fig. 1.

Bracket 10 may be rigidly fixed to the rear end 9 of the engine by two bolts 40 or by any other suitable means. Preferably bracket 10 has a flange 41 which fits snugly under a projecting portion 42 of the engine in order to provide a more secure and rigid connection between the engine and bracket 10. Bracket 10 is of course bolted to the side rail 13 by the six bolts 45, each of which is simply inserted through one of the metal spools 21 and drawn up tight so that each spool 21 is clamped rigid with the side rail 13. It is thus seen that bracket 10 may be very simply bolted in place upon the side rail 13, or removed at will, without changing or in any way interfering with the previously accurately adjusted initial compression upon the resilient bushings 21. The amount of this initial compression is of course determined by the dimensions of the rubber bushing and the metal parts shown in Fig. 4 and will be the same for all units assembled in the same manner (as described above) from parts having the same dimensions.

It is to be understood that this invention is not limited to engine mounting brackets but may be used with advantage in many applications where it is desired to provide a firm but very slightly resilient connection between two parts to prevent transmission of sound or sound producing vibrations. For instance, it may be used to connect the frame members of an automobile body to provide a body frame which is more resistant to shock or sudden stresses of any kind. It may also be conveniently used to mount running boards upon the chassis frame, or the radiator core or shell upon their supporting parts. In any application of this invention where it appears preferable, rivets may be substituted for the clamping bolts 45 which rigidly fix the metal spools 21 to one of the connected members.

Obviously rivets can be conveniently used since they could be easily headed up against the solid support of the metal spools 21 entirely independent of the resilient bushings 20.

While the form of embodiment of the present invention as herein disclosed, constitutes a preferred form, it is to be understood that other forms might be adopted, all coming within the scope of the claims which follow.

What is claimed is as follows:

1. A metal-isolating mounting unit for connecting two metal members, comprising: a bracket having relatively thin metal walls and adapted to be secured to one of said members, said bracket having a plurality of spaced holes through said relatively thin walls thereof, a resilient non-metallic bushing permanently mounted in each of said holes and projecting at both ends therefrom, central tubes within said bushings each having end flanges permanently fixed thereto and forced axially upon the opposed ends of said bushing to highly compress said resilient bushing and cause it to bulge radially outwardly under said end flanges and isolate said flanges from said bracket, whereby said tubes and end flanges may be bolted rigidly to the other of said connected members without in any way disturbing the endwise compression upon said resilient bushing.

2. A metal isolating mounting unit for connecting two metal members, comprising: a bracket having thin metal walls and adapted to be secured to one of said members, said bracket having a plurality of spaced holes through said thin metal walls thereof, a resilient non-metallic bushing permanently mounted in each of said holes and projecting at both ends therefrom, central tubes within said bushings each having end flanges telescoped thereupon and forced axially upon the projecting ends of said bushings to highly compress the resilient material and cause it to bulge radially outward between said end flanges and bracket, said end flanges being permanently fixed to said central tubes and thereby held in their compressing position, said tubes and end flanges being adapted to serve as isolated bolt holes in said bracket whereby said bracket may be bolted to the other of said connected members but held isolated therefrom by said resilient bushings without change in the endwise compression upon said resilient bushing.

3. In combination, a metal member having a relatively thin wall and a bolt hole through said thin wall by means of which another metal part may be bolted thereto, a resilient non-metallic material bushing permanently mounted within said hole and projecting at both ends therefrom, a central metal tube within said bushing having end flanges permanently fixed thereto and forced axially upon the projecting ends of said bushing to highly compress the resilient material and cause it to bulge radially outward between said end flanges and said member, whereby said second metal part may be bolted rigidly to said tube and its end flanges without disturbing the initial compression upon said resilient bushing.

4. In combination, a metal member having a relatively thin wall and a bolt hole through said wall by means of which another metal part may be bolted thereto, a resilient non-metallic material bushing permanently mounted within said hole and projecting at both ends therefrom, a central metal tube within said bushing having end flanges permanently fixed thereto and forced axially upon the projecting ends of said bushing to highly compress the resilient material and cause it to bulge radially outward between said end flanges and said member, and a spacer tube surrounding said central tube and serving to limit the axial movement of said end flanges toward each other.

5. In combination, a metal member having a bolt hole therein by means of which another metal part may be bolted thereto, a resilient non-metallic material bushing permanently mounted within said hole and projecting at both ends therefrom, a spacer tube within said bushing, a central tube within said spacer tube having annular disks telescoped upon its opposite ends and forced axially upon the projecting ends of said bushing to highly compress said resilient bushing, said central tube having its ends pressed over upon said annular disks whereby to permanently clamp said disks rigid with said central and spacer tubes.

In testimony whereof I hereto affix my signature.

HARVEY D. GEYER.